(12) United States Patent
Sporer et al.

(10) Patent No.: US 11,650,382 B1
(45) Date of Patent: May 16, 2023

(54) OPTICAL COMPONENTS UNDERCUT BY A SEALED CAVITY

(71) Applicant: GLOBALFOUNDRIES U.S. Inc., Malta, NY (US)

(72) Inventors: Ryan Sporer, Mechanicville, NY (US); Yusheng Bian, Ballston Lake, NY (US); Takako Hirokawa, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/510,934

(22) Filed: Oct. 26, 2021

(51) Int. Cl.
 *H04B 10/00* (2013.01)
 *G02B 6/42* (2006.01)
 *G02B 6/30* (2006.01)

(52) U.S. Cl.
 CPC ........... *G02B 6/4251* (2013.01); *G02B 6/305* (2013.01)

(58) Field of Classification Search
 CPC combination set(s) only.
 See application file for complete search history.

(56) References Cited

U.S. PATENT DOCUMENTS

| | | | | |
|---|---|---|---|---|
| 5,232,866 A | * | 8/1993 | Beyer | H01L 21/764 257/E21.573 |
| 5,703,895 A | * | 12/1997 | Ghirardi | G02B 6/305 372/50.1 |
| 6,293,688 B1 | * | 9/2001 | Deacon | G02B 6/42 362/556 |
| 6,955,988 B2 | * | 10/2005 | Nevin | H01L 21/30604 438/749 |
| 8,722,508 B2 | * | 5/2014 | Botula | H01L 21/76283 257/E21.573 |
| 9,219,068 B2 | | 12/2015 | Cheng et al. | |
| 9,453,969 B2 | * | 9/2016 | Kobyakov | G02B 6/1228 |
| 10,571,633 B1 | * | 2/2020 | Chen | G02B 6/136 |
| 10,784,147 B2 | * | 9/2020 | Uhlig | H01L 21/76865 |
| 10,795,188 B2 | | 10/2020 | Aflatouni et al. | |
| 10,816,726 B1 | * | 10/2020 | Peng | G02B 6/3636 |
| 10,989,876 B1 | * | 4/2021 | Peng | G02B 6/26 |
| 2001/0000914 A1 | * | 5/2001 | Park | H01L 29/66757 257/E21.573 |
| 2004/0101020 A1 | * | 5/2004 | Bhandarkar | G02B 6/4257 372/109 |
| 2004/0129998 A1 | * | 7/2004 | Inoh | H01L 21/84 257/E27.005 |

(Continued)

OTHER PUBLICATIONS

Asli Sahin et al., "Methods of Forming a V-Groove for a Fiber Optics Cable on an Integrated Photonics Chip" filed Mar. 3, 2020 as U.S. Appl. No. 16/807,811.

(Continued)

*Primary Examiner* — Agustin Bello
(74) *Attorney, Agent, or Firm* — Thompson Hine LLP; Anthony Canale

(57) ABSTRACT

Structures including an optical component, such as an edge coupler, and methods of fabricating a structure that includes an optical component, such as an edge coupler. The structure includes a substrate having a sealed cavity, an optical component, and a dielectric layer between the optical component and the sealed cavity. The optical component is positioned vertically over the substrate and the dielectric layer, and the optical component overlaps with the sealed cavity in the substrate.

18 Claims, 16 Drawing Sheets

(56) References Cited

U.S. PATENT DOCUMENTS

| | | | | |
|---|---|---|---|---|
| 2009/0245728 | A1* | 10/2009 | Cherchi | G02B 6/305 264/1.25 |
| 2011/0117747 | A1* | 5/2011 | Wey | B81C 1/00246 257/E21.218 |
| 2011/0150386 | A1* | 6/2011 | Dupuis | G02B 6/10 264/1.24 |
| 2015/0293299 | A1* | 10/2015 | Xu | G02B 6/1228 385/28 |
| 2016/0315452 | A1* | 10/2016 | Chen | G02B 6/34 |
| 2017/0017050 | A1* | 1/2017 | Gamache | G02B 6/4251 |
| 2019/0187373 | A1* | 6/2019 | Shubin | G02B 6/305 |
| 2021/0405298 | A1* | 12/2021 | Lin | G02B 6/305 |

OTHER PUBLICATIONS

Yusheng Bian et al., "Edge Couplers With Stacked Layering" filed Apr. 27, 2020 as U.S. Appl. No. 16/859,347.

Asli Sahin et al., Photonics Integrated Circuit With Silicon Nitride Waveguide Edge Coupler filed Feb. 19, 2021 as U.S. Appl. No. 17/179,532.

Kevin K. Dezfulian et al., "Hybrid Edge Couplers With Layers in Multiple Levels" filed Feb. 8, 2021 as U.S. Appl. No. 17/169,971.

IMEC, "IMEC's Si Photonics Platform: Prototyping Services on 200mm and 300 mm Wafers", Mar. 2019, www.imec-int.com, retrieved from the internet at https://www.imec-int.com/drupal/sites/default/files/2019-03/SILICON-PHOTONICS-V06.pdf.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

M. Rakowski, C. Meagher, K. Nummy, A. Aboketaf, J. Ayala, Y. Bian, B. Harris, K. Mclean, K. McStay, A. Sahin, L. Medina, B. Peng, Z. Sowinski, A. Stricker, T. Houghton, C. Hedges, K. Giewont, A. Jacob, T. Letavic, D. Riggs, A. Yu, and J. Pellerin, "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.

B. Peng, I. Barwicz, A. Sahin, I. Houghton, B. Hedrick, Y. Bian, M. Rakowski, S. Hu, J. Ayala, C. Meagher, Z. Sowinski, K. Nummy, A. Stricker, J. Lubguban, H. Chen, B. Fasano, I. Melville, Z. Wu, J. K. Cho, A. Jacob, D. Riggs, D. Berger, T. Letavic, A. Yu, J. Pellerin, and K. Giewont, "A CMOS Compatible Monolithic Fiber Attach Solution with Reliable Performance and Self-alignment," in Optical Fiber Communication Conference (OFC) 2020, OSA Technical Digest (Optical Society of America, 2020), paper Th3I.4.

Y. Bian et al., "Monolithically integrated silicon nitride platform," 2021 Optical Fiber Communications Conference and Exhibition (OFC), 2021, pp. 1-3.

A. Aboketaf, C. Hedges, V. Dhurgude, B. Harris, F. Guan, F. Pavlik, T. Anderson, A. Stricker, Y. Bian, M. Rakowski, A. Dasgupta, and A. Paganini, "Towards fully automated testing and characterization for photonic compact modeling on 300-mm wafer platform," in Optical Fiber Communication Conference (OFC) 2021, P. Dong, J. Kani, C. Xie, R. Casellas, C. Cole, and M. Li, eds., OSA Technical Digest (Optical Society of America, 2021), paper W6A.1.

Mu, Xin, Sailong Wu, Lirong Cheng, and H.Y. Fu 2020. "Edge Couplers in Silicon Photonic Integrated Circuits: A Review" Applied Sciences 10, No. 4: 1538.

* cited by examiner

OPTICAL COMPONENTS UNDERCUT BY A SEALED CAVITY

BACKGROUND

The present invention relates to photonics chips and, more specifically, to structures including an optical component, such as an edge coupler, and methods of fabricating a structure that includes an optical component, such as an edge coupler.

Photonics chips are used in many applications and systems including, but not limited to, data communication systems and data computation systems. A photonics chip integrates optical components, such as waveguides, photodetectors, modulators, and optical power splitters, and electronic components, such as field-effect transistors, into a unified platform. Factors such as layout area, cost, and operational overhead may be reduced by the integration of both types of components on the same chip.

An edge coupler, also known as a spot-size converter, is commonly used for coupling light of a given mode from a light source, such as a laser or an optical fiber, to optical components on the photonics chip. The edge coupler may include a section of a waveguide core that defines an inverse taper located adjacent to the light source. An inverse taper refers to a tapered section of a waveguide core characterized by a gradual increase in width along a mode propagation direction. In the edge coupler construction, the narrow end of the inverse taper provides a facet that is positioned adjacent to the light source, and the wide end of the inverse taper is connected with another section of the waveguide core that routes the light to the optical components of the photonics chip.

The gradually-varying cross-sectional area of the inverse taper supports mode transformation and mode size variation associated with mode conversion when light is transferred from the light source to the edge coupler. The narrow end at the tip of the inverse taper is unable to fully confine the incident mode received from the light source because the cross-section area of the tip at its narrow end is considerably smaller than the mode size. Consequently, a significant percentage of the electromagnetic field of the incident mode is distributed about the tip of the inverse taper. As its width increases, the inverse taper can support the entire incident mode and confine the electromagnetic field.

Conventional edge couplers may exhibit significant leakage losses, particularly for large mode sizes, to the substrate of the photonics chip. Satisfactory corrective measures have proven difficult to implement.

Improved structures including an optical component, such as an edge coupler, and methods of fabricating a structure that includes an optical component, such as an edge coupler, are needed.

SUMMARY

In an embodiment of the invention, a structure includes a substrate having a sealed cavity, an optical component, and a dielectric layer between the optical component and the sealed cavity. The optical component is positioned vertically over the substrate and the dielectric layer, and the optical component overlaps with the sealed cavity in the substrate.

In an embodiment of the invention, a method includes forming an optical component, and forming a sealed cavity in a substrate. A dielectric layer is positioned between the optical component and the sealed cavity. The optical component is positioned vertically over the substrate and the dielectric layer, and the optical component overlaps with the sealed cavity in the substrate.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
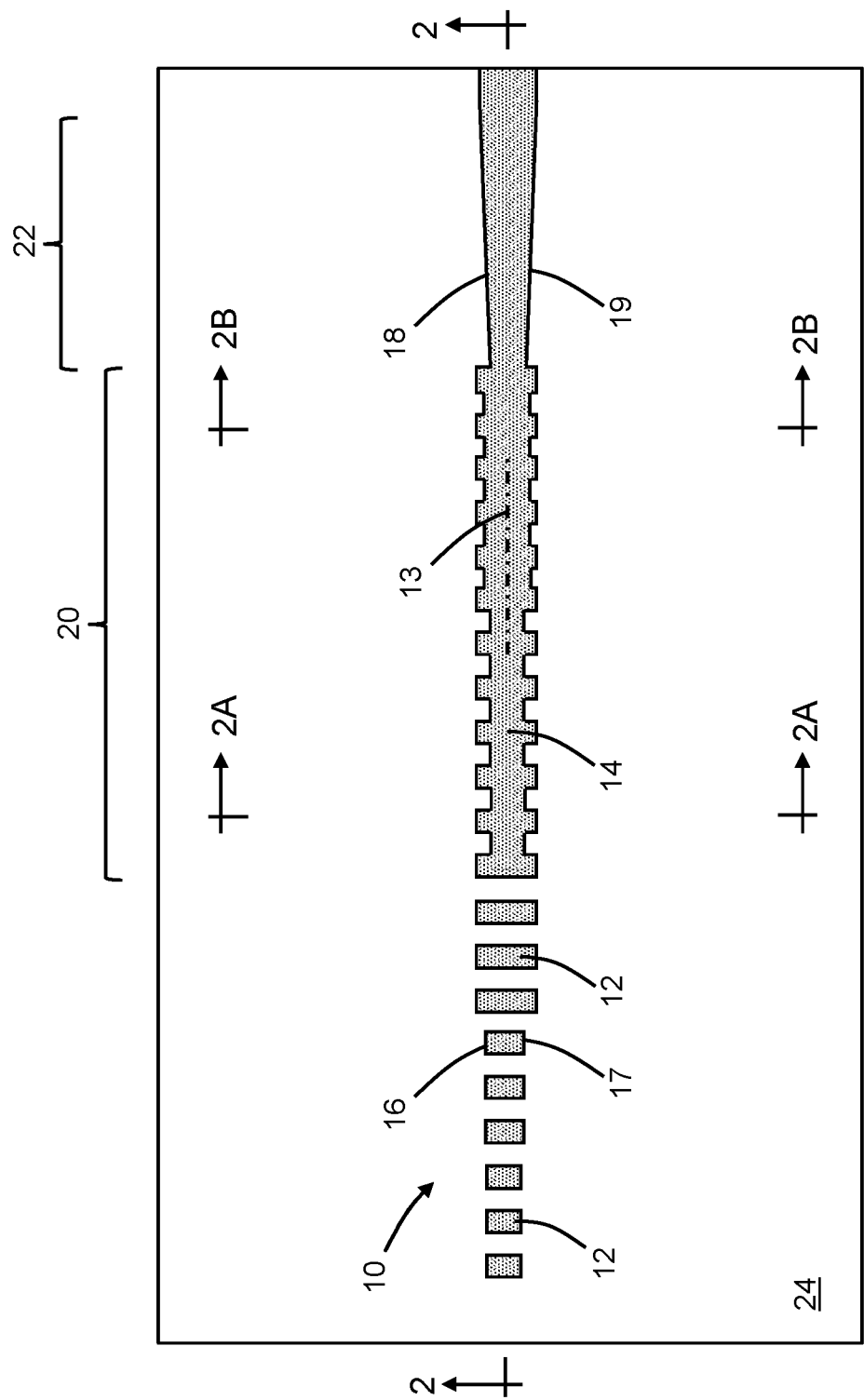
FIG. 1 is a top view of a structure at an initial fabrication stage of a processing method in accordance with embodiments of the invention.
Figure 2:
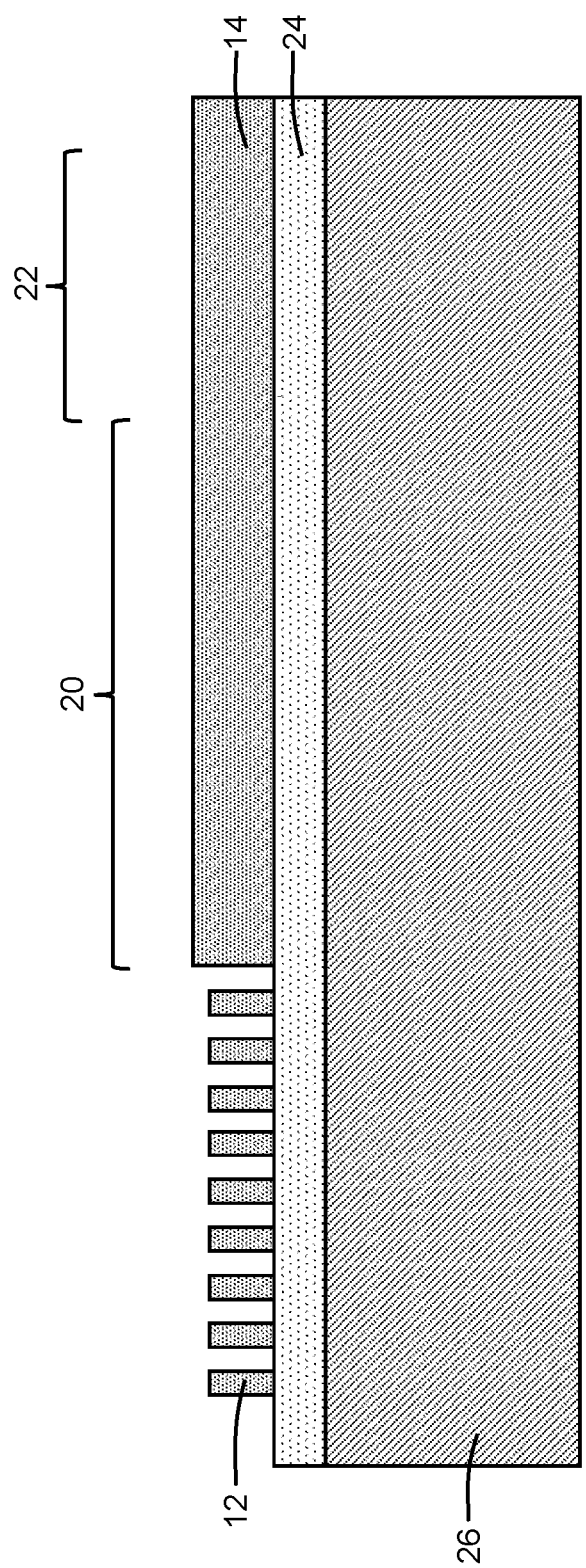
FIG. 2 is a cross-sectional view of the structure taken generally along line 2-2 in FIG. 1.
Figure 2A:
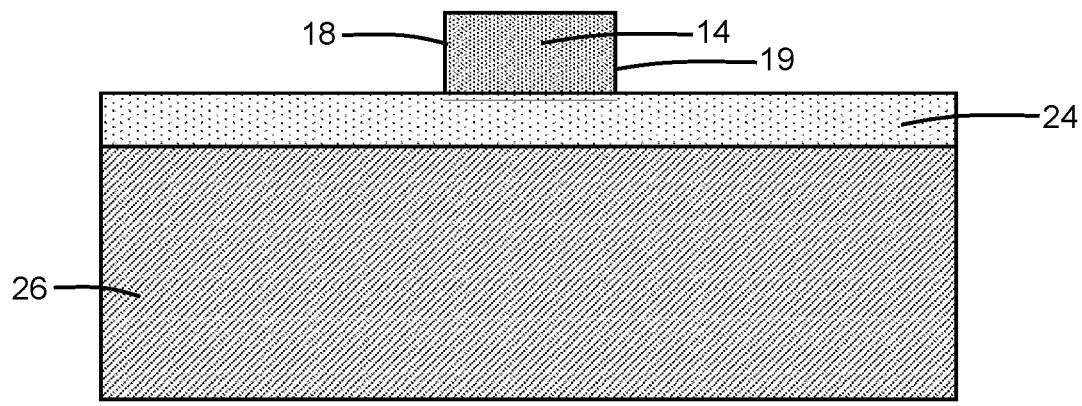
FIG. 2A is a cross-sectional view of the structure taken generally along line 2A-2A in FIG. 1.
Figure 2B:
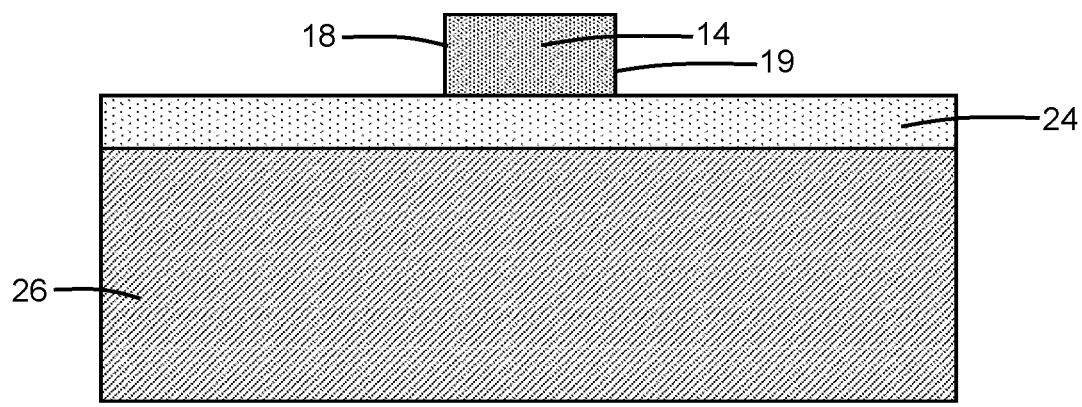
FIG. 2B is a cross-sectional view of the structure taken generally along line 2B-2B in FIG. 1.
Figure 3:
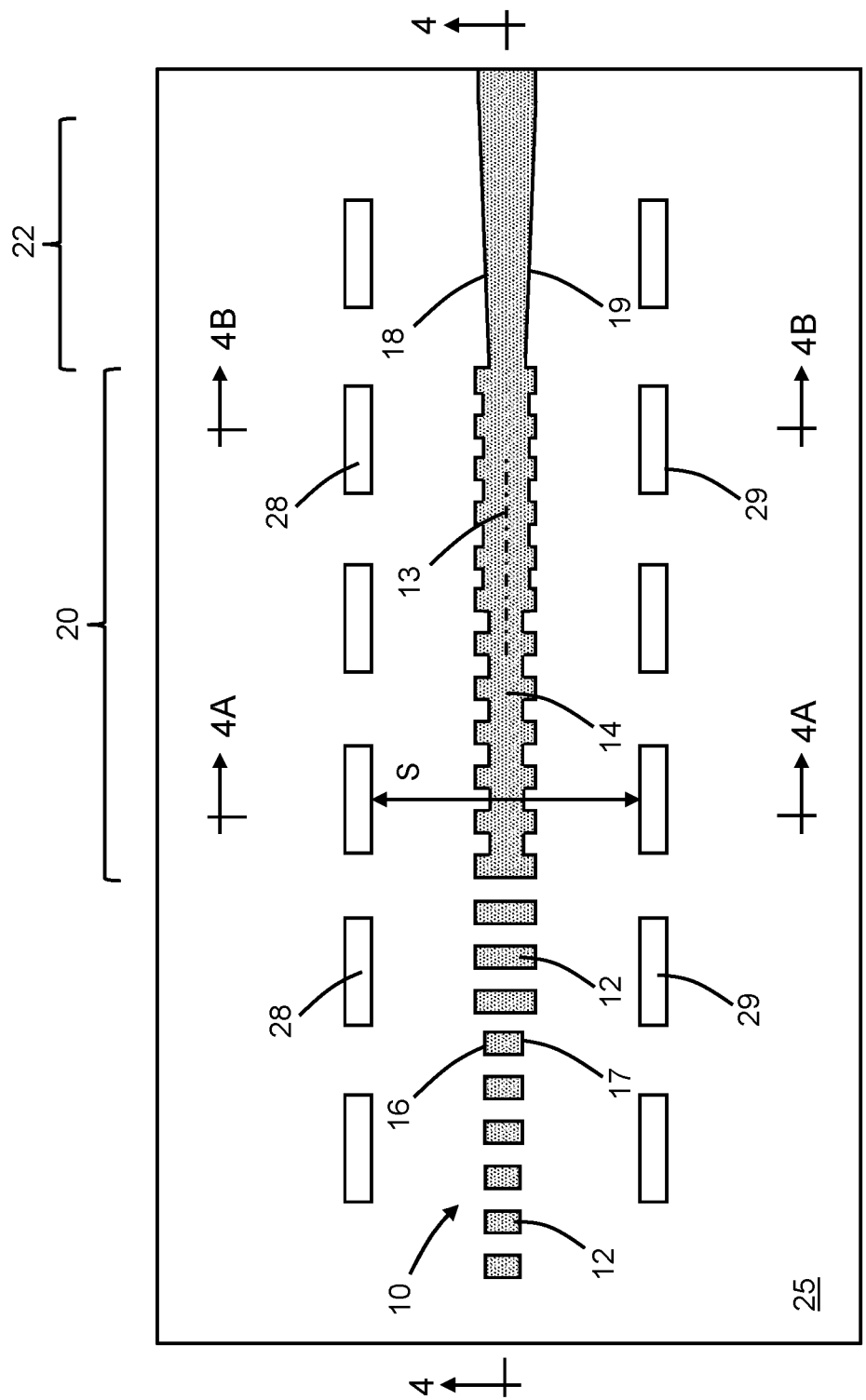
FIG. 3 is a top view of the structure at a fabrication stage of the processing method subsequent to FIG. 1.
Figure 4:
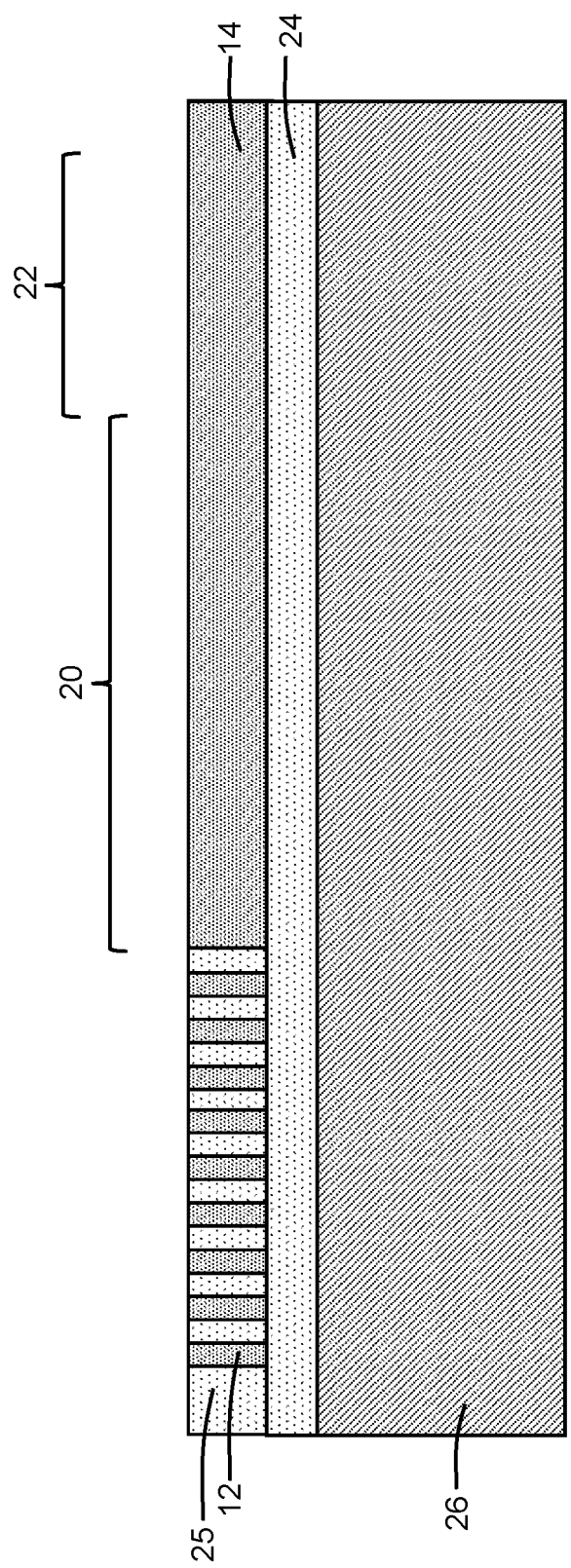
FIG. 4 is a cross-sectional view of the structure taken generally along line 4-4 in FIG. 3.
Figure 4A:
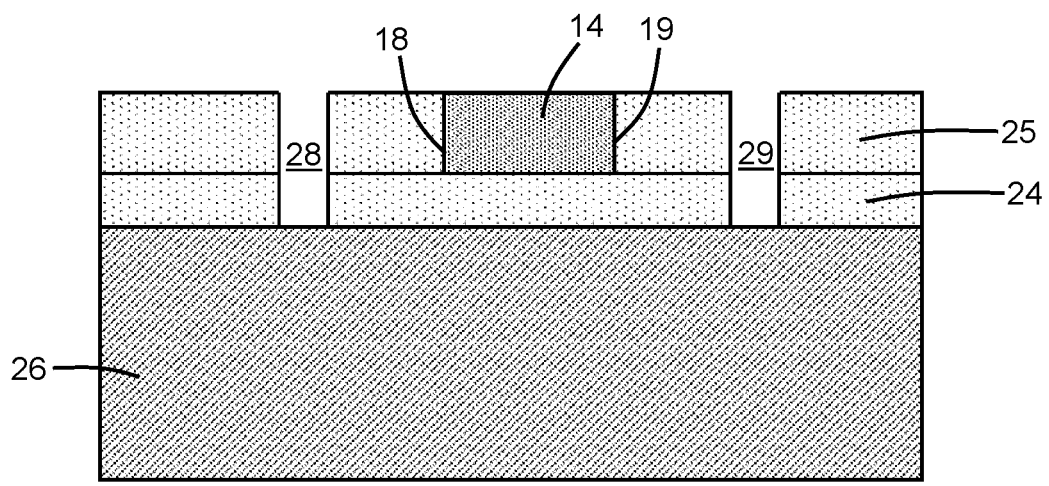
FIG. 4A is a cross-sectional view of the structure taken generally along line 4A-4A in FIG. 3.
Figure 4B:
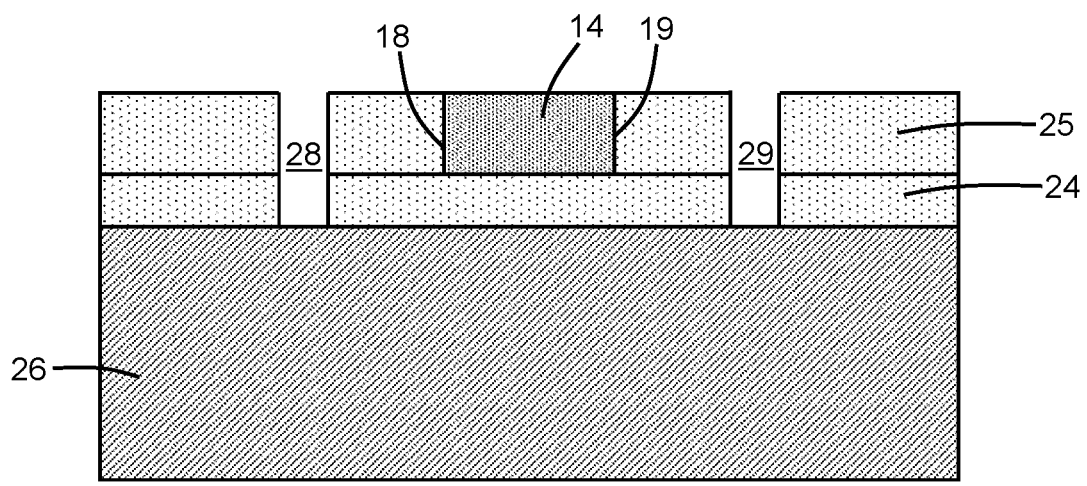
FIG. 4B is a cross-sectional view of the structure taken generally along line 4B-4B in FIG. 3.
Figure 5:
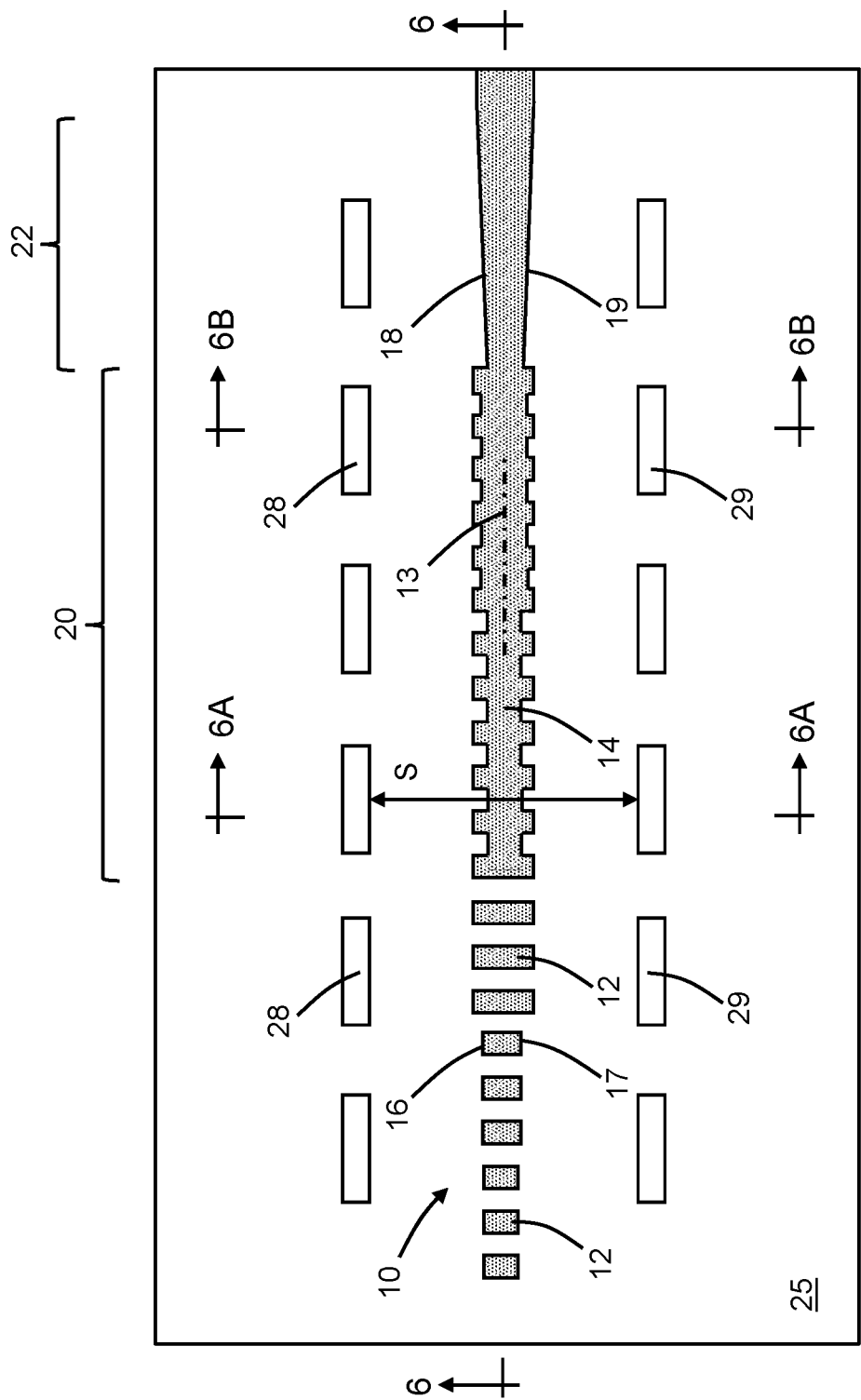
FIG. 5 is a top view of the structure at a fabrication stage of the processing method subsequent to FIG. 3.
Figure 6:
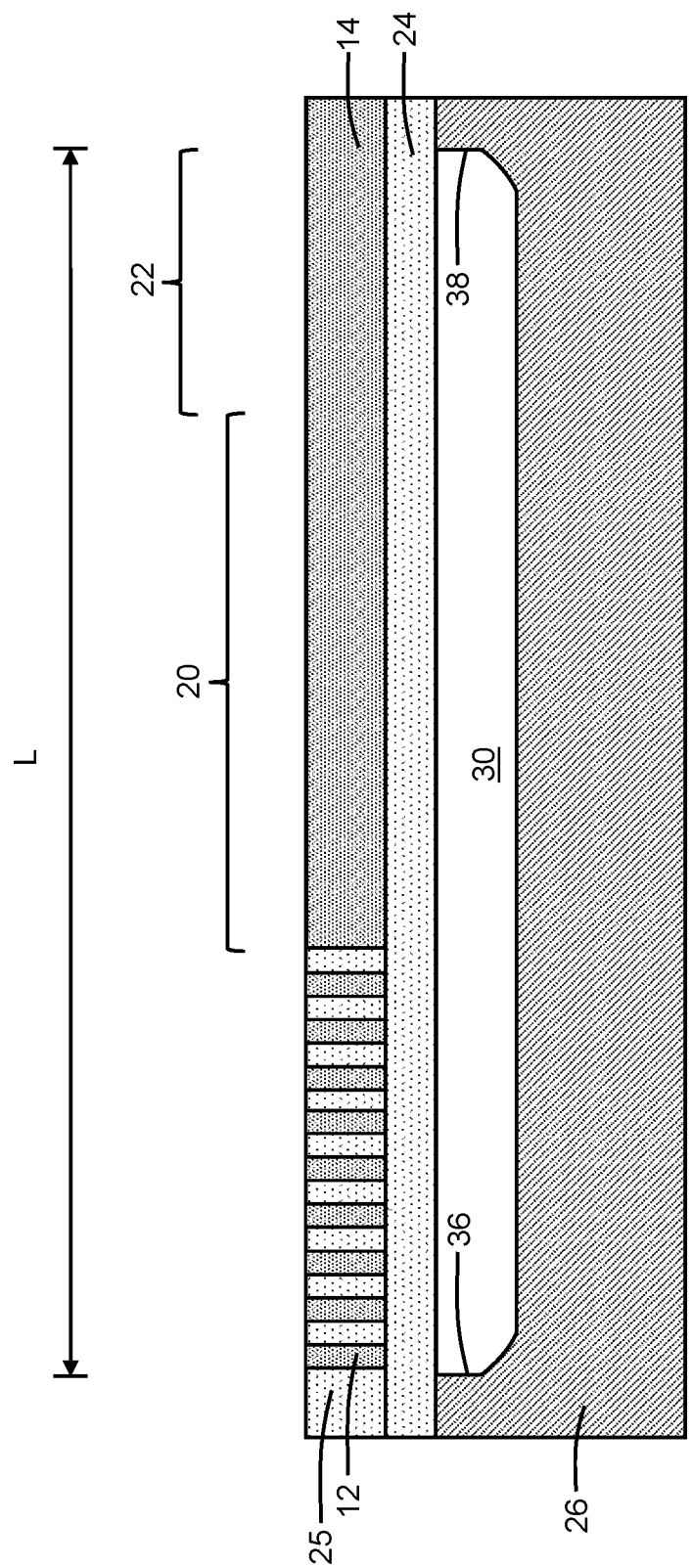
FIG. 6 is a cross-sectional view of the structure taken generally along line 6-6 in FIG. 5.
Figure 6A:
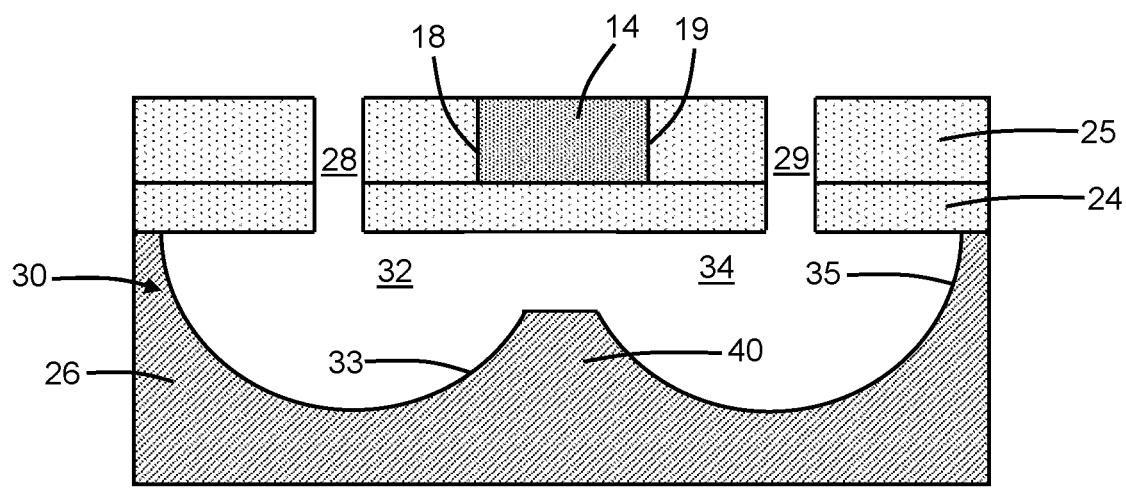
FIG. 6A is a cross-sectional view of the structure taken generally along line 6A-6A in FIG. 5.
Figure 6B:
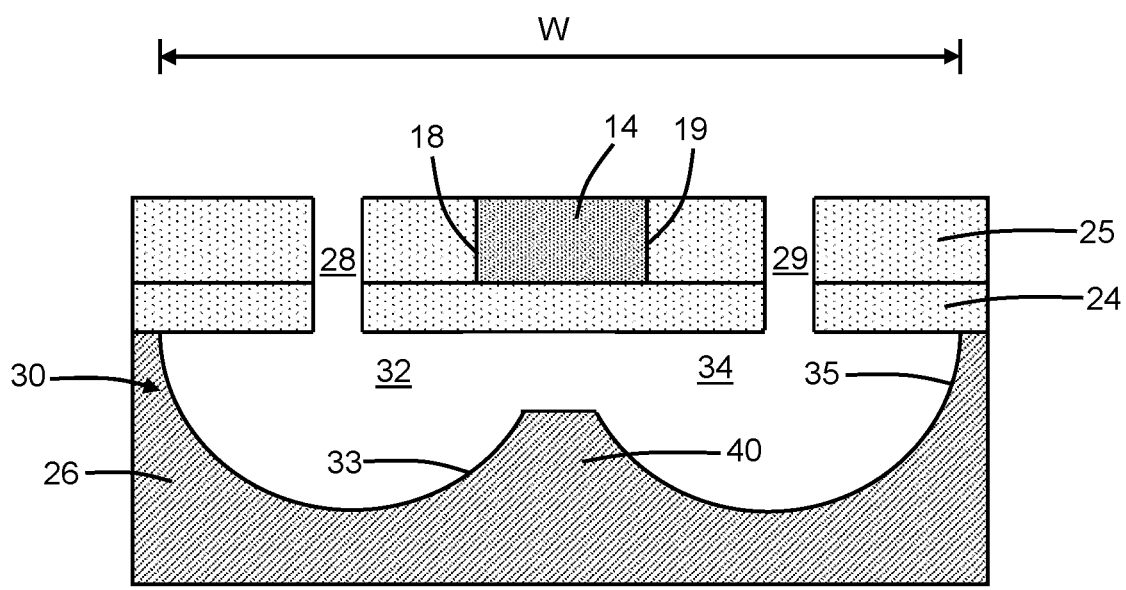
FIG. 6B is a cross-sectional view of the structure taken generally along line 6B-6B in FIG. 5.
Figure 7:
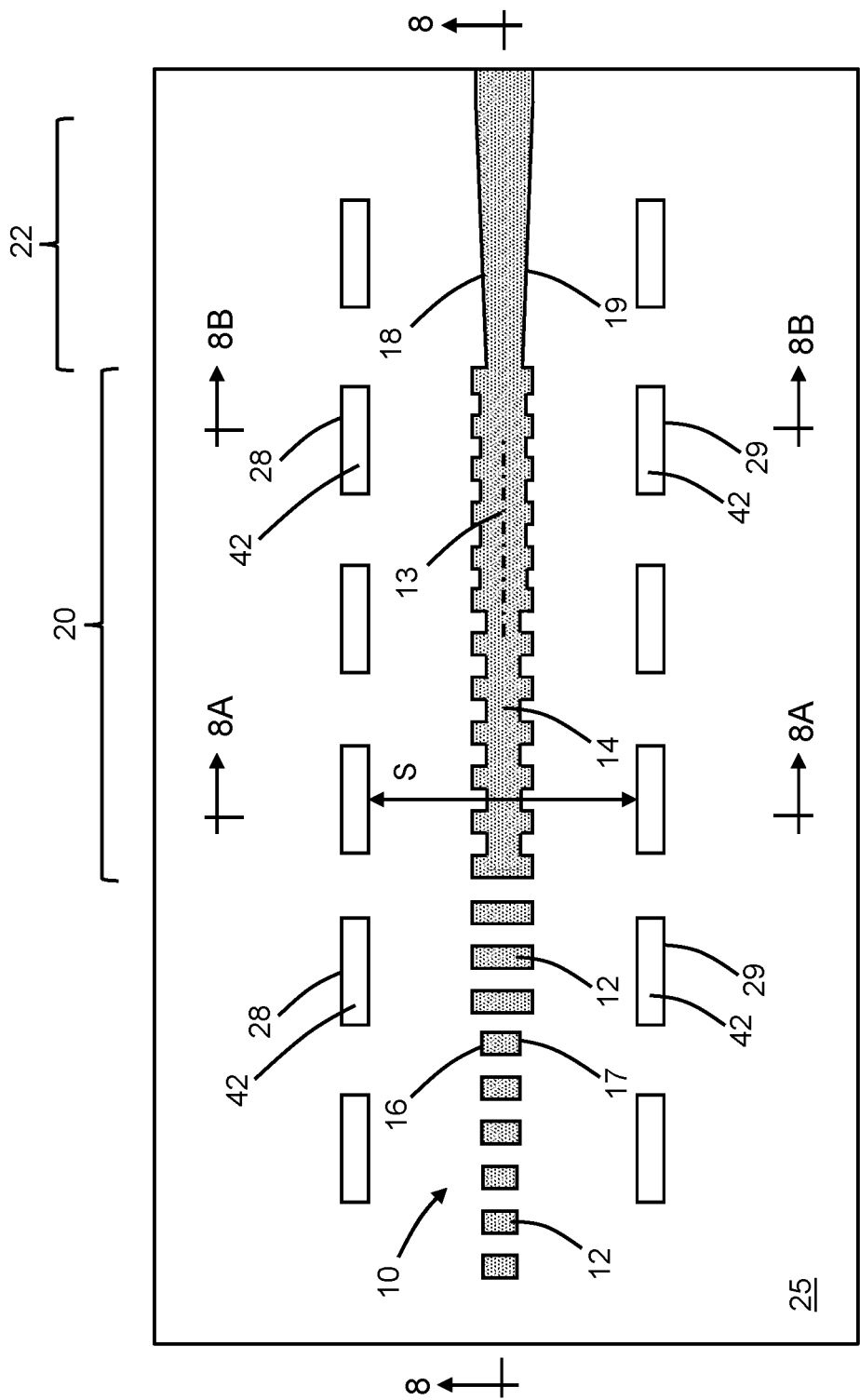
FIG. 7 is a top view of the structure at a fabrication stage of the processing method subsequent to FIG. 5.
Figure 8:
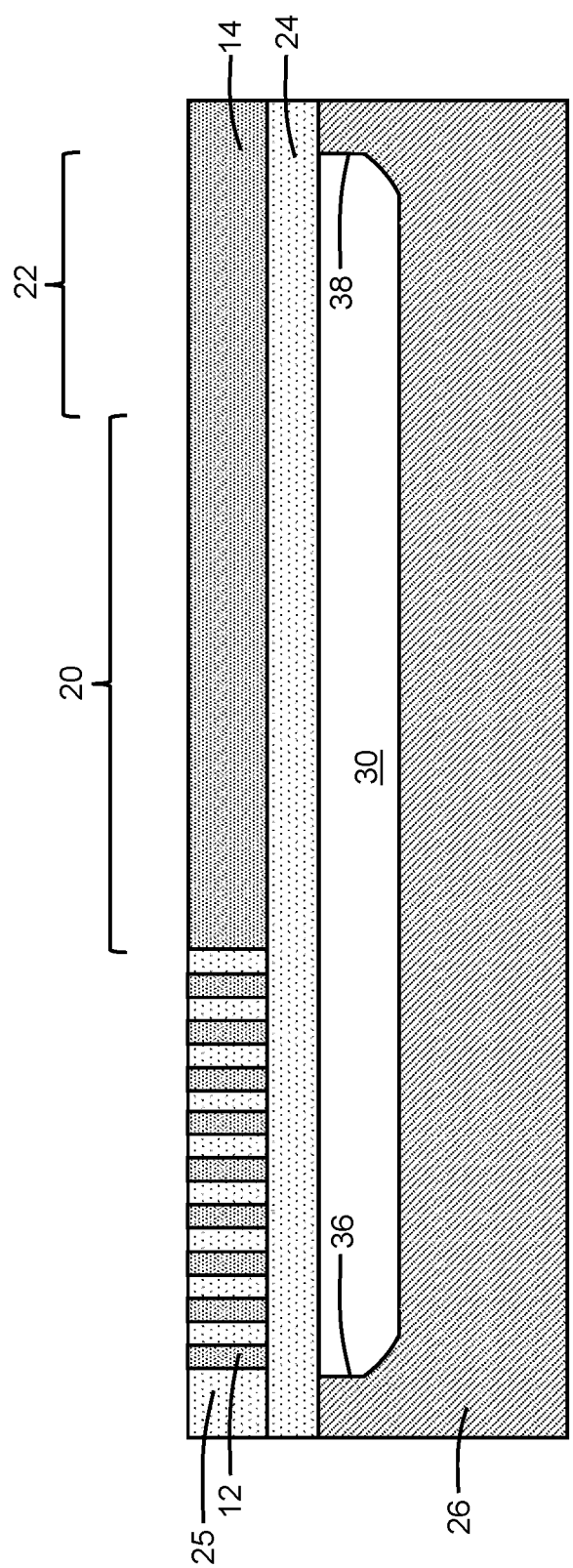
FIG. 8 is a cross-sectional view of the structure taken generally along line 8-8 in FIG. 7.
Figure 8A:
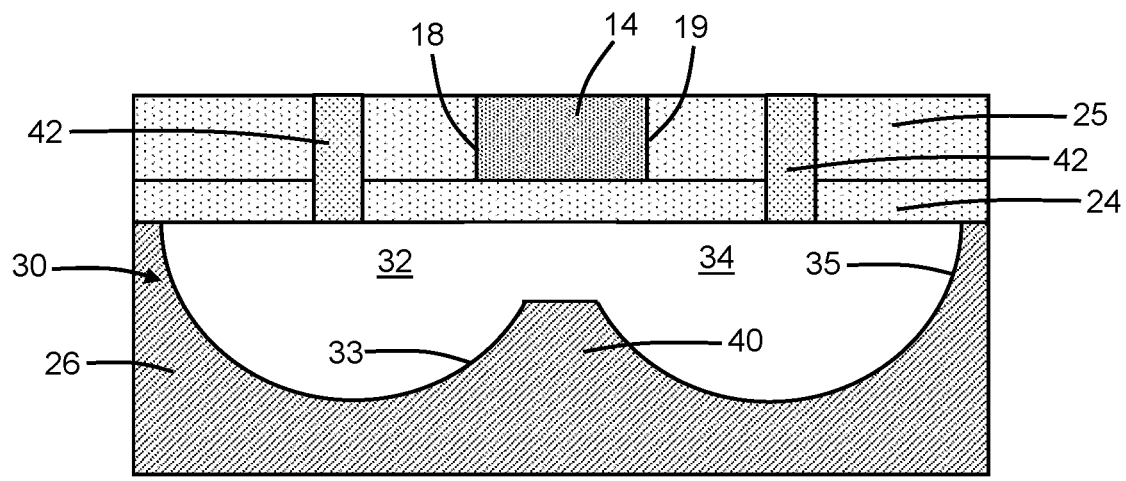
FIG. 8A is a cross-sectional view of the structure taken generally along line 8A-8A in FIG. 7.
Figure 8B:
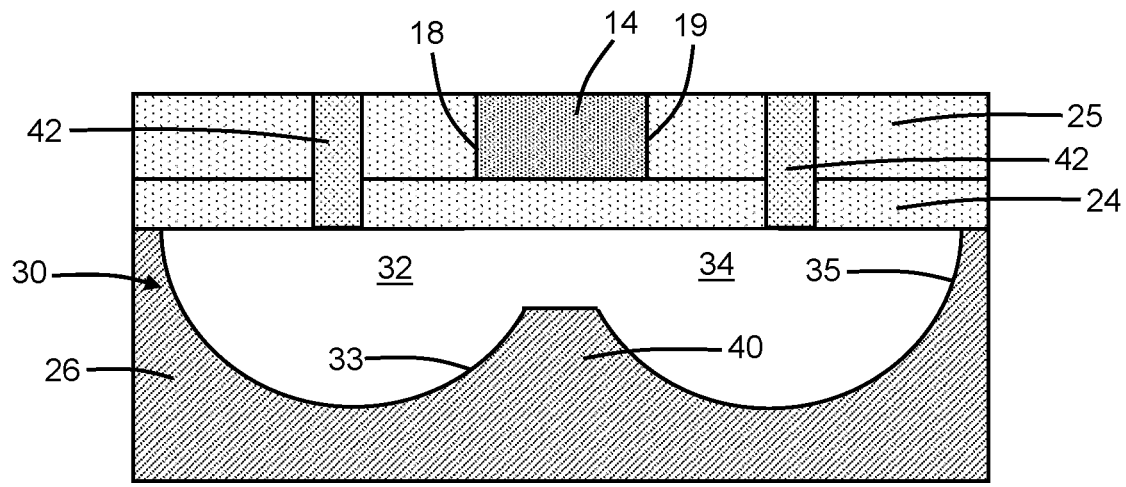
FIG. 8B is a cross-sectional view of the structure taken generally along line 8B-8B in FIG. 7.
Figure 9:
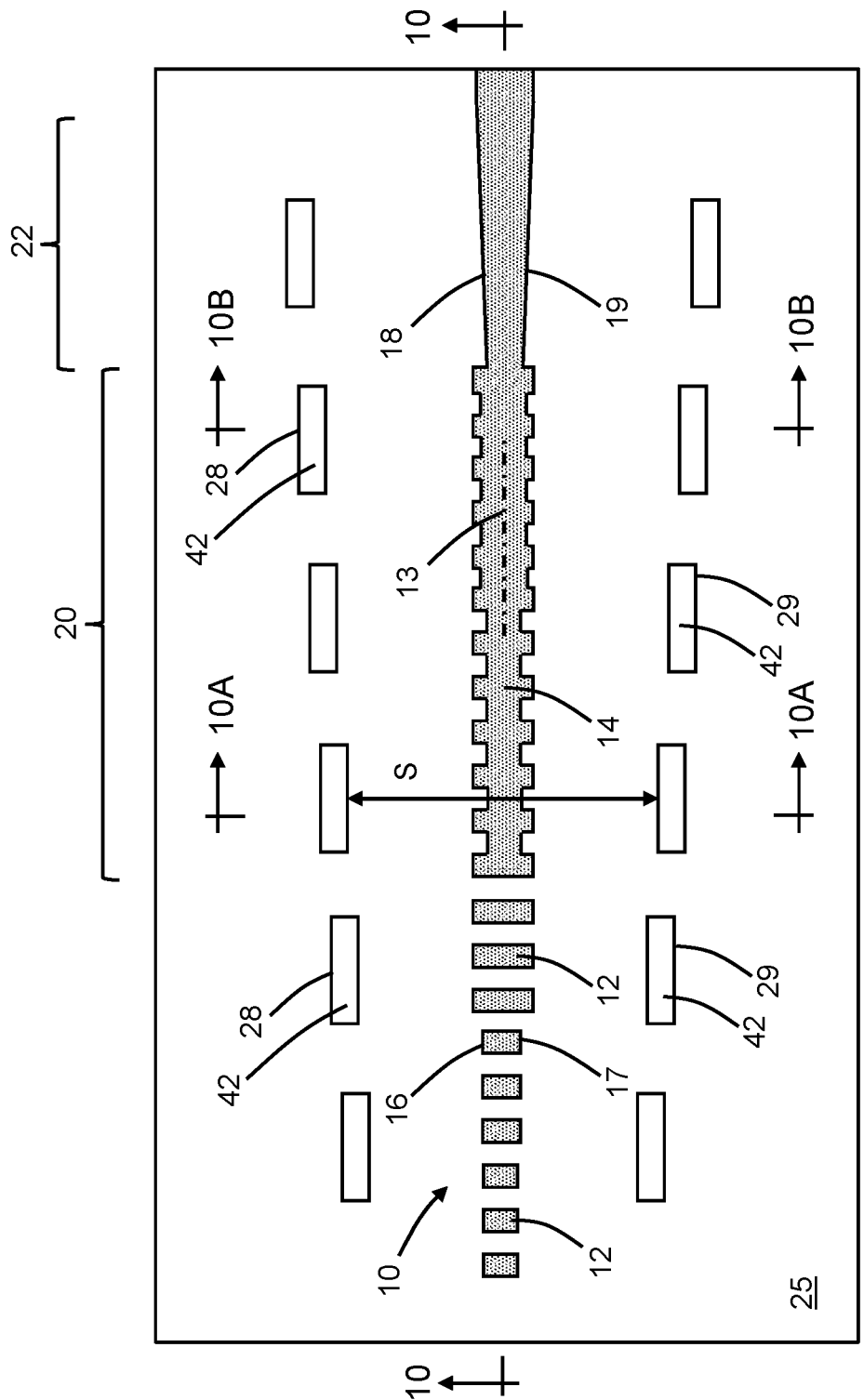
FIG. 9 is a top view of the structure at a fabrication stage of the processing method subsequent to FIG. 7.

With reference to FIGS. 1, 2, 2A, 2B and in accordance with embodiments of the invention, an edge coupler 10 includes multiple segments 12 and sections 20, 22 of a waveguide core 14 that are positioned adjacent to the segments 12. The segments 12 and sections 20, 22 of the waveguide core 14 are arranged along a longitudinal axis 13 of the edge coupler 10. The segments 12 are positioned with a spaced arrangement along the longitudinal axis 13 as features in a portion of the edge coupler 10 that initially receives light from a light source, such as an optical fiber or laser. Light propagates within the edge coupler 10 in a direction from the segments 12 toward the sections 20, 22 of the waveguide core 14. Each segment 12 has opposite sidewalls 16, 17 at its side edges, and the waveguide core 14 includes opposite sidewalls 18, 19 at its side edges. The section 20 of the waveguide core 14 includes indentations or notches in the sidewalls 18, 19, and the section 22 of the edge coupler 10 is tapered.

In alternative embodiments, the edge coupler 10 may have a different construction. In alternative embodiments, the edge coupler 10 may be replaced by a different type of optical component, such as a ribbed waveguide core, a tapered waveguide core, a straight waveguide core, etc.

The edge coupler 10 may be positioned over a dielectric layer 24. In an embodiment, the dielectric layer 24 may be comprised of silicon dioxide. In an embodiment, the dielectric layer 24 may be a buried oxide layer of a silicon-on-insulator substrate, and the silicon-on-insulator substrate may further include a substrate 26 comprised of a semiconductor material (e.g., single-crystal silicon). The segments 12 and waveguide core 14 may be comprised of a semiconductor material, such as single-crystal silicon. In an embodiment, the segments 12 and waveguide core 14 may be concurrently formed by patterning a single-crystal silicon device layer of a silicon-on-insulator substrate with lithography and etching processes. In an embodiment, the segments 12 and the waveguide core 14 may be patterned from the device layer by lithography and etching processes without etching fully through the device layer to form a connected slab layer that is thinner than the segments 12 and waveguide core 14.

In alternative embodiments, the edge coupler 10 may be comprised of a different material. In an embodiment, the segments 12 and waveguide core 14 may be comprised of a dielectric material, such as silicon nitride. The segments 12 and waveguide core 14 may be formed by depositing a layer of the constituent material, and patterning the deposited layer with lithography and etching processes.

With reference to FIGS. 3, 4, 4A, 4B in which like reference numerals refer to like features in FIGS. 1, 2, 2A, 2B and at a subsequent fabrication stage, a dielectric layer 25 may be deposited over the edge coupler 10 and dielectric layer 24. The dielectric layer 25 may be comprised of a dielectric material, such as silicon dioxide, that is deposited by chemical vapor deposition and planarized by chemical-mechanical polishing.

The dielectric layers 24, 25 are patterned with lithography and etching processes to define openings 28, 29 that penetrate fully through the dielectric layers 24, 25 to the substrate 26. The lithography process may entail forming an etch mask that includes a layer of photoresist applied by a spin coating process, pre-baked, exposed to light projected through a photomask, baked after exposure, and developed with a chemical developer to form respective openings over the intended locations for the openings 28, 29. The etching process may be an anisotropic etching process, such as a reactive ion etching process, and the etch mask may be stripped by, for example, plasma ashing after forming the openings 28, 29.

The openings 28, 29 may be elongate or slotted in shape with a length that is significantly larger than their width, and may be arranged with a given pitch in parallel rows of a rectangular array that is symmetrically positioned relative to the longitudinal axis 13 of the edge coupler 10. The openings 28 may be positioned in the dielectric layer 24 adjacent to the sidewall 16 of the sections 20, 22 of the waveguide core 14 and the sidewalls 18 of the segments 12. The openings 29 may be positioned in the dielectric layer 24 adjacent to the sidewall 17 of the sections 20, 22 of the waveguide core 14 and the sidewalls 19 of the segments 12. In a direction transverse to the longitudinal axis 13, the openings 28 and the openings 29 are separated by a spacing S. The openings 28, 29 define pilot holes extending through the dielectric layer 24 to the substrate 26 for performing a subsequent isotropic etching process to etch the substrate 26. Portions of the dielectric layer 24 are positioned as bridges between adjacent pairs of the openings 28 and as bridges between adjacent pairs of the openings 29 in order to sustain mechanical support following the performance of the subsequent isotropic etching process removing the substrate 26 beneath the dielectric layer 24.

The openings 28, 29 may have a uniform pitch to define a periodic arrangement. In alternative embodiments, the pitch of the openings 28, 29 may be apodized (i.e., non-uniform) to define a non-periodic arrangement. In an embodiment, the openings 28, 29 may have a rectangular patterned shape. In alternative embodiments, the openings 28, 29 may have a different patterned shape, such as an oval shape or a trapezoidal shape. The openings 28, 29 may have a major axis (i.e., length) that is aligned with the longitudinal axis 13 of the edge coupler 10 or, alternatively, the major axis of the openings 28, 29 may be angled or tilted relative to, or even aligned perpendicular to, the longitudinal axis 13 of the edge coupler 10. In alternative embodiments, multiple adjacent rows of openings 28 and/or multiple adjacent rows of openings 29 may be formed.

With reference to FIGS. 5, 6, 6A, 6B in which like reference numerals refer to like features in FIGS. 3, 4, 4A, 4B and at a subsequent fabrication stage, a cavity 30 is formed in the substrate 26 using a wet or dry isotropic etching process with the patterned dielectric layer 24 functioning as a hardmask. The openings 28, 29 provide access to the substrate 26 for the isotropic etching process performed to form the cavity 30. The isotropic etching process includes a lateral etching component that deepens the cavity 30 and a vertical etching component that widens the cavity 30. In an embodiment, the cavity 30 may be centered between the row of openings 28 and the row of openings 29. The lengths, widths, and pitches of the openings 28, 29 may be adjusted to adjust the properties of the cavity 30.

The cavity 30 is positioned in the substrate 26 beneath the segments 12 and the sections 20, 22 of the waveguide core 14. The edge coupler 10 is positioned on the dielectric layer 24 to overlap with the cavity 30 in the substrate 26. In an embodiment, the edge coupler 10 may be centered over the cavity 30. The cavity 30 includes a chamber 32 and a chamber 34 that is connected to, and merges with, the chamber 32. The chamber 32 is in communication with the openings 28, the chamber 34 is in communication with the openings 29, and the chambers 32, 34 merge during etching due to the lateral etching component. The cavity 30 may have a length L between an end 36 and an end 38 opposite to the end 36, and the cavity 30 may extend over a full length of the edge coupler 10. The cavity 30 has a width W that is greater than a width of the edge coupler 10. The cavity 30 is closed at the opposite ends 36, 38, and portions of the substrate 26 are positioned at the opposite ends 36, 38 as respective longitudinal boundaries. The isotropic etching process may be controlled such that neither of the ends 36, 38 is opened by, for example, intersecting an edge of the substrate 26.

The cavity 30 is collectively surrounded by the dielectric layer 24 from above and by the substrate 26 from below and laterally, which fully seals the cavity 30 with the exception of the openings 28, 29 that are subsequently sealed. The chamber 32 includes a curved sidewall 33 and the chamber 34 includes a curved sidewall 35 that intersects the sidewall 33 to define a ridge 40 as a cusp. In an embodiment in which the openings 28 and the openings 29 are symmetrically positioned relative to the edge coupler 10, the ridge 40 may be positioned directly beneath the segments 12 and the sections 20, 22 of the waveguide core 14.

With reference to FIGS. 7, 8, 8A, 8B in which like reference numerals refer to like features in FIGS. 5, 6, 6A, 6B and at a subsequent fabrication stage, plugs 42 are formed in the openings 28, 29. The plugs 42 may be formed by depositing a dielectric layer over the edge coupler 10 and dielectric layer 25 by chemical vapor deposition and planarizing the dielectric layer by chemical-mechanical polishing. The plugs 42 may be comprised of a dielectric material, such as silicon dioxide.

The plugs 42 fill and occlude at least a portion of each of the openings 28, 29 in the dielectric layers 24, 25 as obstructions blocking the openings 28, 29. After forming the plugs 42, the cavity 30 is fully sealed to define an airgap that may contain atmospheric air at or near atmospheric pressure, may contain another gas at or near atmospheric pressure, or may contain atmospheric air or another gas at a sub-atmospheric pressure (e.g., a partial vacuum). The airgap defined by the sealed cavity 30 may be characterized by a permittivity or dielectric constant of near unity (i.e., vacuum permittivity), which is less than the dielectric constant of a solid dielectric material. The refractive index of the sealed cavity 30, which is proportional to the dielectric constant, is significantly lower than the refractive index of solid dielectric material.

The structure including the edge coupler 10 and sealed cavity 30, in any of its embodiments described herein, may be integrated into a photonics chip that includes electronic components and additional optical components. For example, the electronic components may include field-effect transistors that are fabricated by CMOS processing.

The edge coupler 10 is undercut by the sealed cavity 30 in the substrate 26. During operation, the structure including the edge coupler 10 and sealed cavity 30 may exhibit reduced leakage loss of light from the edge coupler 10 to the substrate 26 because of the low-index open space introduced by the sealed cavity 30 between the edge coupler 10 and the substrate 26. The structure including the edge coupler 10 and sealed cavity 30 may also enhance the thermal isolation of the edge coupler 10 relative to the substrate 26 by eliminating a pathway for thermal conduction from the edge coupler 10 to the substrate 26.

With reference to FIGS. 9, 10, 10A, 10B and in accordance with alternative embodiments of the invention, the openings 28 and the openings 29 may be positioned in a tapered array in which the spacing S between adjacent pairs of the openings 28 and the openings 29 in the different rows of the array varies longitudinally from a narrow spacing to a wide spacing. The variation in spacing S may lead to a variation in the shape of the cavity 30 at different locations along a direction between the end 36 and the end 38 and parallel to the longitudinal axis 13 of the edge coupler 10. For example, the shape of the ridge 40 may vary over the length of the cavity 30 at different locations along a direction between the end 36 and the end 38 because of the change in the spacing S. In an embodiment, the variation in the shape of the cavity 30 may be continuous along its length.

Figure 10:
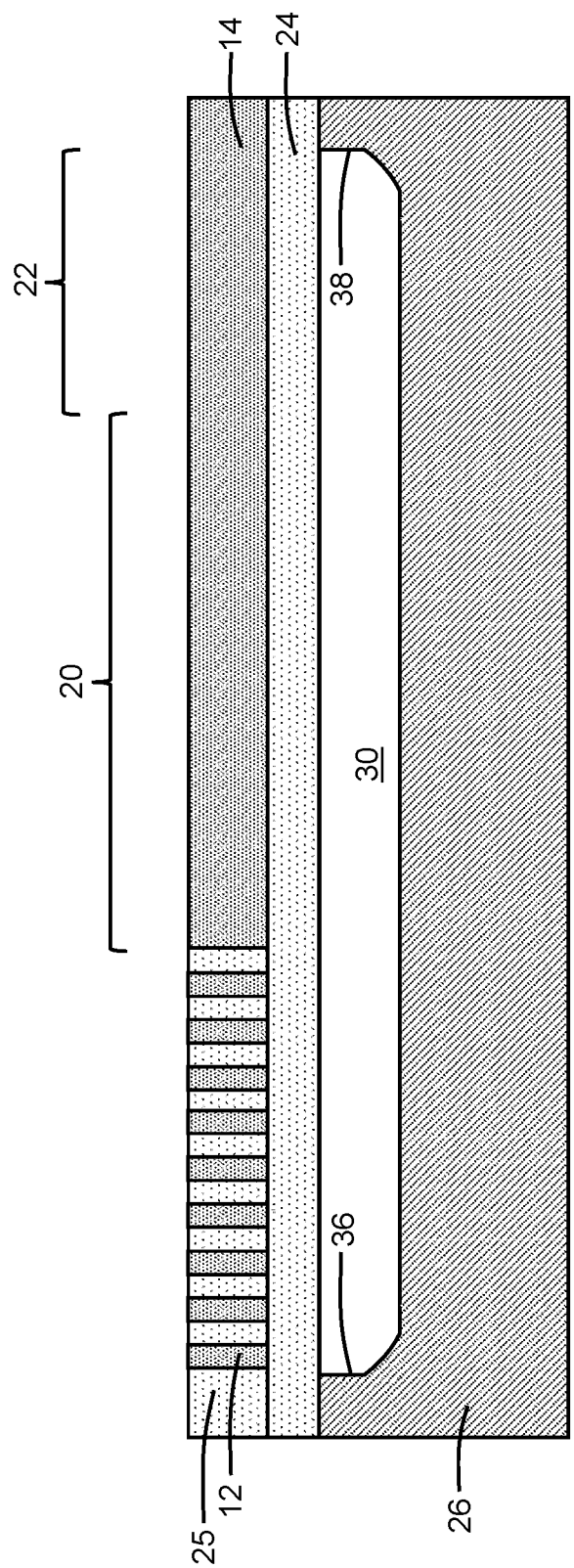
FIG. 10 is a cross-sectional view of the structure taken generally along line 10-10 in FIG. 9.
Figure 10A:
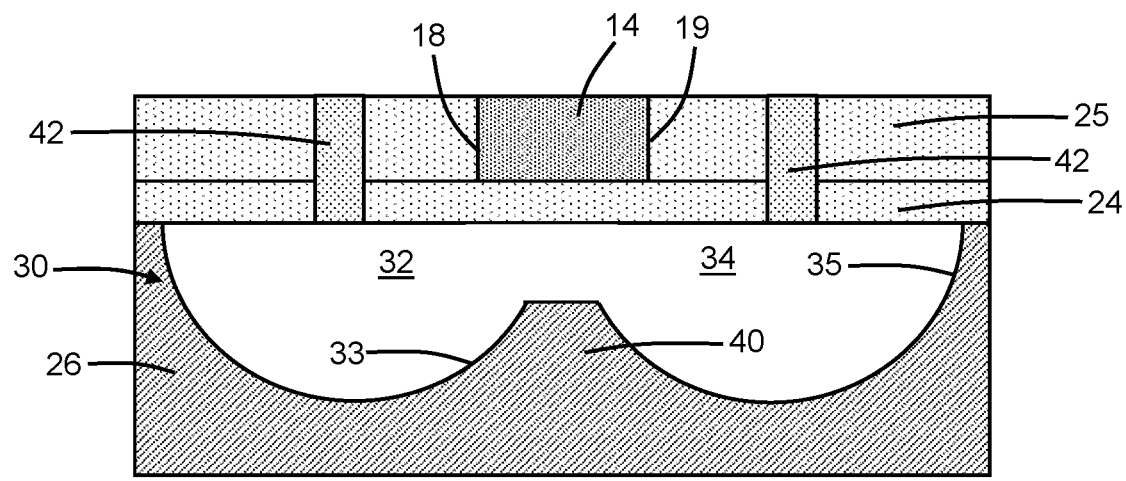
FIG. 10A is a cross-sectional view of the structure taken generally along line 10A-10A in FIG. 9.
Figure 10B:
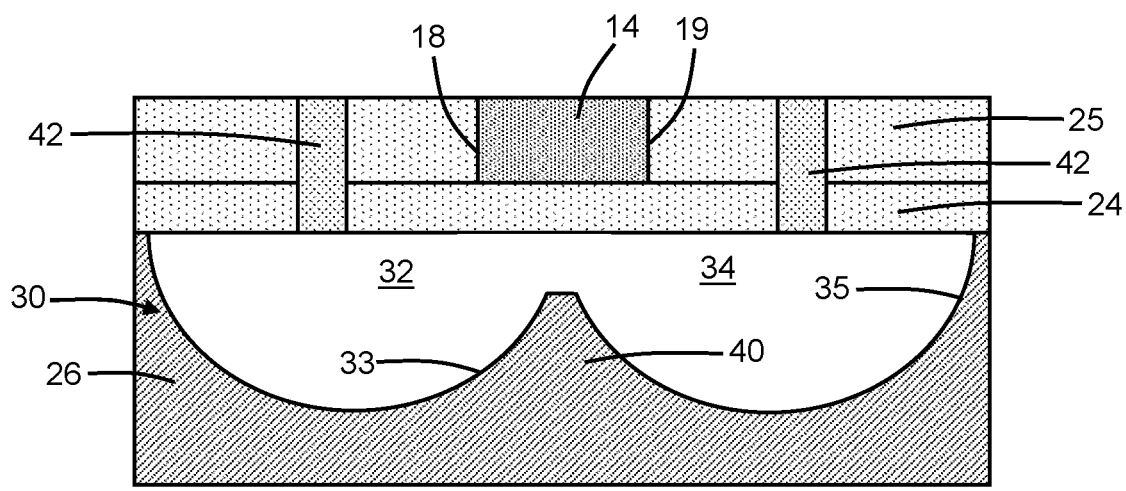
FIG. 10B is a cross-sectional view of the structure taken generally along line 10B-10B in FIG. 9.
Figure 11:
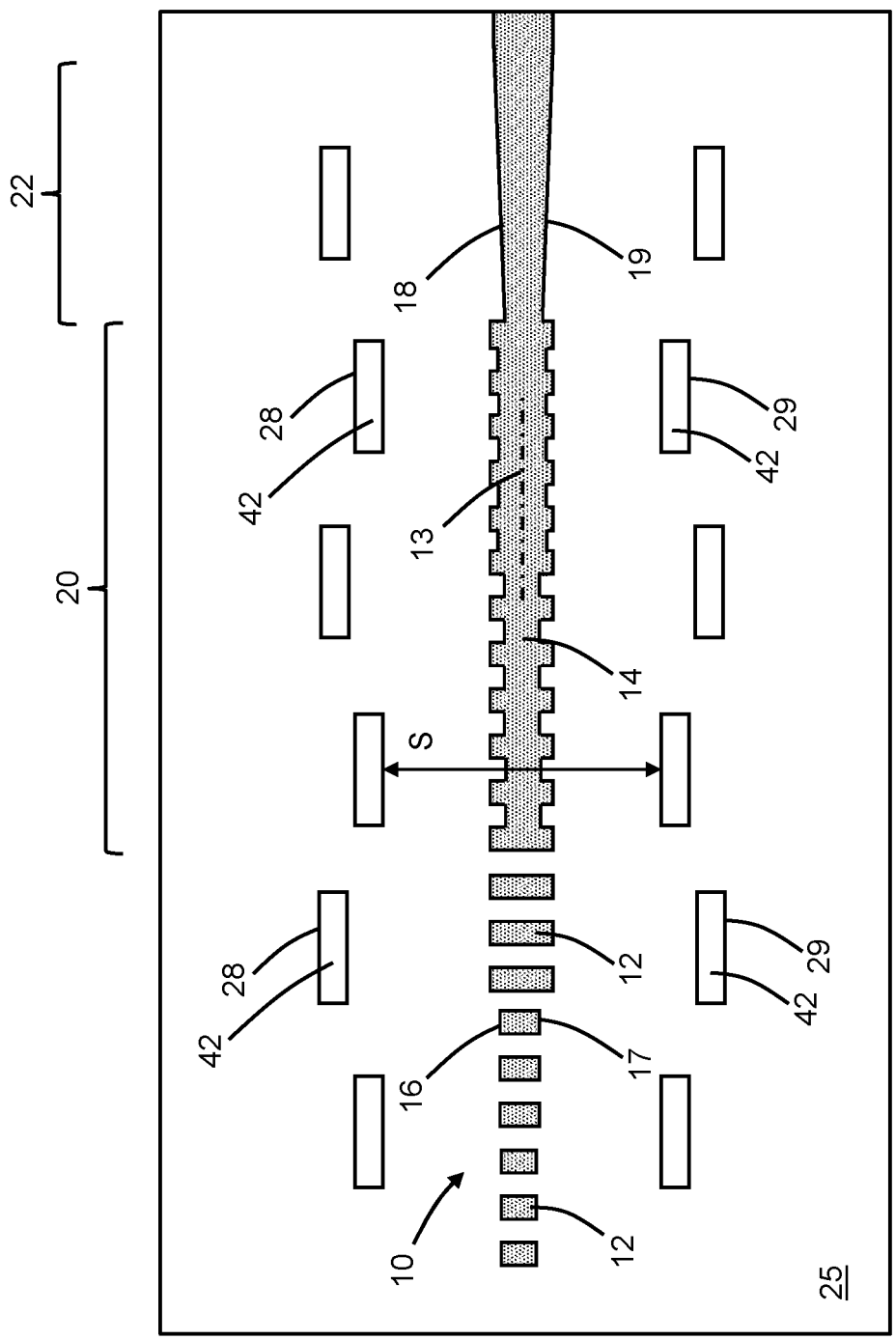
FIG. 11 is a top view of a structure in accordance with alternative embodiments of the invention.

With reference to FIG. 11 and in accordance with alternative embodiments of the invention, the openings 28 and the openings 29 may be arranged with an offset to provide a staggered arrangement within each row of the array such that the spacing S periodically varies along a direction between the end 36 and the end 38 between a smaller spacing and a larger spacing. The variation in the positions of the openings 28, 29 may lead to a variation in the shape of the cavity 30 (e.g., a change in the shape of the ridge 40) at different locations between the end 36 and the end 38, as generally shown in FIGS. 10A, 10B. The shape change of the cavity 30 may vary locally according to the varying offset.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a substrate including a sealed cavity;
   an edge coupler including a waveguide core having a first sidewall and a second sidewall, the edge coupler having a longitudinal axis; and
   a dielectric layer between the waveguide core and the sealed cavity, the dielectric layer including a first plurality of plugged openings that extend to the sealed cavity and a second plurality of plugged openings that extend to the sealed cavity, the first plurality of plugged openings positioned adjacent to the first sidewall of the waveguide core, the second plurality of plugged openings positioned adjacent to the second sidewall of the waveguide core, and the first plurality of plugged openings and the second plurality of plugged openings disposed in a tapered array with a spacing between the first plurality of plugged openings and the second plurality of plugged openings that varies with location along the longitudinal axis,
   wherein the first plurality of plugged openings and the second plurality of plugged openings have rectangular shapes, the waveguide core is positioned over the substrate and the dielectric layer, the sealed cavity has a shape that varies with location along the longitudinal axis, and the waveguide core overlaps with the sealed cavity in the substrate.

2. The structure of claim 1 wherein the dielectric layer and the substrate collectively surround the sealed cavity.

3. The structure of claim 2 wherein the dielectric layer includes a first plurality of plugs that occlude the first plurality of plugged openings and a second plurality of plugs that occlude the second plurality of plugged openings.

4. The structure of claim 1 wherein the sealed cavity includes a first chamber and a second chamber, the sealed cavity has a first end and a second end spaced from the first end along the longitudinal axis, the first chamber has a first sidewall that is curved, the second chamber has a second sidewall that is curved, and the first sidewall of the first chamber and the second sidewall of the second chamber intersect at ridge that extends from the first end to the second end.

5. The structure of claim 4 wherein the edge coupler is centered relative to the first chamber and the second chamber.

6. The structure of claim 1 wherein the sealed cavity has a first end and a second end spaced from the first send along the longitudinal axis, and the shape of the sealed cavity varies between the first end and the second end.

7. The structure of claim 1 wherein the dielectric layer a plurality of first plugs that occlude the first plurality of plugged openings and a plurality of second plugs that occlude the second plurality of plugged openings.

8. The structure of claim 1 wherein the edge coupler comprises single-crystal silicon.

9. A method comprising:
   forming an edge coupler including a waveguide core having a first sidewall and a second sidewall, wherein the edge coupler has a longitudinal axis; and
   forming a sealed cavity in a substrate,
   wherein a dielectric layer is positioned between the edge coupler and the sealed cavity, the edge coupler is positioned over the substrate and the dielectric layer, the dielectric layer includes a first plurality of plugged openings that extend to the sealed cavity and a second plurality of plugged openings that extend to the sealed cavity, the first plurality of plugged openings are positioned adjacent to the first sidewall of the waveguide core, the second plurality of plugged openings are positioned adjacent to the second sidewall of the waveguide core, the first plurality of plugged openings and the second plurality of plugged openings are disposed in a tapered array with a spacing between the first plurality of plugged openings and the second plurality of plugged openings that varies with location along the longitudinal axis, the first plurality of plugged openings and the second plurality of plugged openings have rectangular shapes, the sealed cavity has a shape that varies with location along the longitudinal axis, and the waveguide core overlaps with the sealed cavity in the substrate.

10. The method of claim 9 wherein the sealed cavity is formed after forming the waveguide core of the edge coupler.

11. A structure comprising:
    a substrate including a sealed cavity;
    an edge coupler including a waveguide core having a first sidewall and a second sidewall, the edge coupler having a longitudinal axis; and
    a dielectric layer between the waveguide core and the sealed cavity, the dielectric layer including a first plurality of plugged openings that extend to the sealed cavity and a second plurality of plugged openings that extend to the sealed cavity, the first plurality of plugged openings positioned adjacent to the first sidewall of the waveguide core, the second plurality of plugged openings positioned adjacent to the second sidewall of the waveguide core, and the first plurality of plugged openings arranged with an offset relative to the second plurality of plugged openings to provide a staggered arrangement between the first plurality of plugged openings and the second plurality of plugged openings that varies between a first spacing in a direction transverse to the longitudinal axis and a second spacing in the direction transverse to the longitudinal axis,
    wherein the staggered arrangement that periodically varies between the first spacing and the second spacing, the waveguide core is positioned over the substrate and the dielectric layer, the sealed cavity has a shape that varies with location along the longitudinal axis, and the waveguide core overlaps with the sealed cavity in the substrate.

12. The structure of claim 11 wherein the dielectric layer and the substrate collectively surround the sealed cavity.

13. The structure of claim 12 wherein the dielectric layer includes a first plurality of plugs that occlude the first plurality of plugged openings and a second plurality of plugs that occlude the second plurality of plugged openings.

14. The structure of claim 11 wherein the sealed cavity includes a first chamber and a second chamber, the sealed cavity has a first end and a second end spaced from the first send along the longitudinal axis, the first chamber has a first sidewall that is curved, the second chamber has a second sidewall that is curved, and the first sidewall of the first chamber and the second sidewall of the second chamber intersect at ridge that extends from the first end to the second end.

15. The structure of claim 11 wherein the sealed cavity has a first end and a second end spaced from the first end along the longitudinal axis, and the shape of the sealed cavity varies between the first end and the second end.

16. The structure of claim 11 wherein the dielectric layer includes a plurality of first plugs that occlude the first plurality of plugged openings and a plurality of second plugs that occlude the second plurality of plugged openings.

17. The structure of claim 11 wherein the edge coupler comprises single-crystal silicon.

18. The structure of claim 11 wherein the first plurality of plugged openings and the second plurality of plugged openings have rectangular shapes.

* * * * *